April 23, 1946.    C. B. PETRY    2,398,959
VACUUM CHUCK FOR GLASS LATHES
Filed Sept. 10, 1943
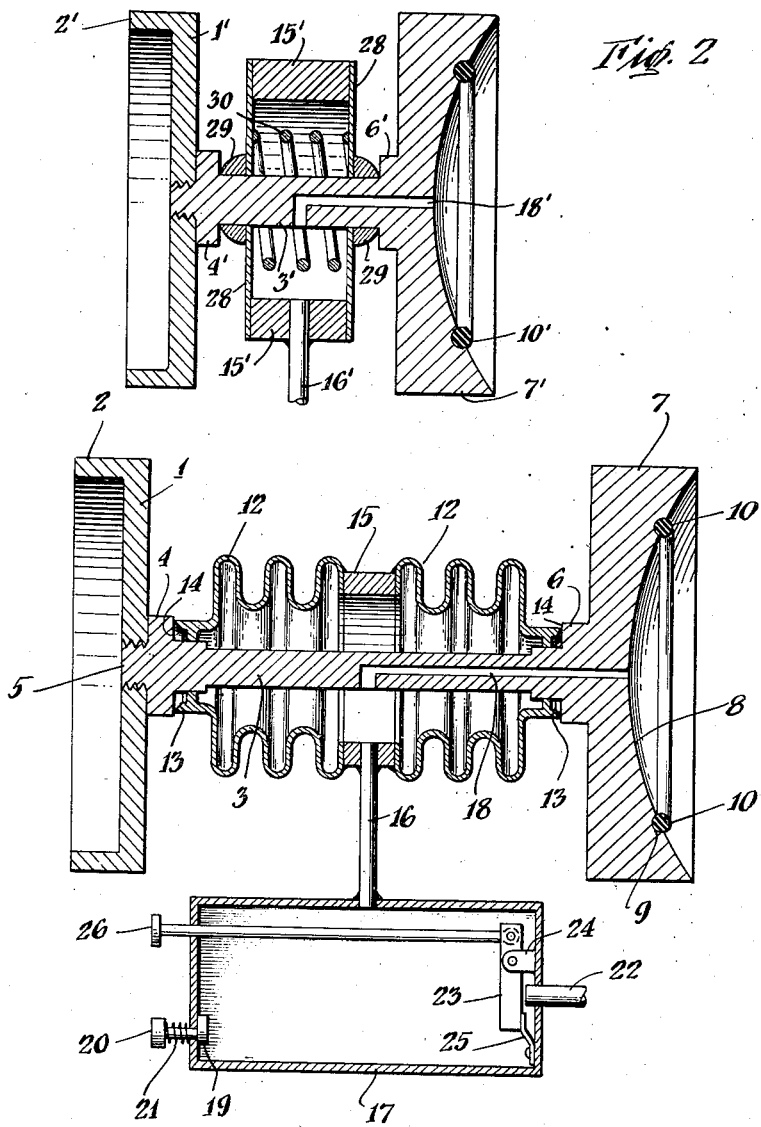
Charles B. Petry. INVENTOR.
BY
Charles W. Mortimer
ATTORNEY Patented Apr. 23, 1946

2,398,959

UNITED STATES PATENT OFFICE 2,398,959

VACUUM CHUCK FOR GLASS LATHES

Charles B. Petry, Fair Lawn, N. J., assignor to Allen B. Du Mont Laboratories, Inc., Passaic, N. J., a corporation of Delaware Application September 10, 1943, Serial No. 501,794

2 Claims. (Cl. 279—3)

This invention relates to a device for attaching glass objects to lathes so as to be able to perform work on such objects conveniently without requiring mechanical clamps or the like.

With this invention glass objects, such as tubes used for making oscillographs for example, can be easily and quickly attached to and removed from a lathe chuck without breaking the glass. The tubes are securely held in place while the lathe is turning and work is being done on the glass by means of blow torches, etc.

In carrying out the invention a chuck is provided for a lathe that has a face against which the work is seated and held in place by means of a vacuum applied through the chuck to keep the work properly located and cause it to turn as the chuck turns.

The invention may be understood from the description in connection with the accompanying drawing, in which:

Fig. 1 is a longitudinal section through the device, which is to be attached to the head stock of a lathe; and Fig. 2 is a modification of one of the parts.

In the drawing, reference character 1 indicates a plate having a flange 2 for convenience in attaching it to the head stock of a lathe. A shaft 3 is provided with a shoulder 4 and a threaded extension 5 for connecting it to the center of the plate 1. The other end of the shaft 3 is provided with a shoulder 6 which carries a thick disc 7 which has a dished outer face 8. A circular groove 9 is provided in this face, and a gasket 10, which may be of rubber or other material and may be of circular or other shape in cross section, is laid in this groove.

A sylphon bellows 12 has portions 13 fitting, in a practically air-tight manner, against surfaces 14 on the shoulders 4 and 6 so that the shaft 3 can turn without turning the bellows 12. The middle portion of the bellows 12 is provided with a ring 15 having a hole in which one end of tube 16 fits, the other end of this tube fitting in the side of vacuum chamber 17. The shaft 3 is provided with a conduit 18 from an intermediate portion through the disc 7.

The vacuum chamber 17 is provided with a valve 19 the stem of which is provided with a head 20, between which and the end of the casing 17 a spring 21 is provided to keep this valve normally closed even when there is a vacuum in the chamber 17.

A tubular connection 22 extends from the vacuum chamber 17 to a vacuum source, not shown. A closure member or valve 23 for the end of connection 22 is pivoted on an extension 24 on the inside of chamber 17 and is normally held open by a spring 25 when a vacuum condition exists in this chamber. An operating rod 26 extends from valve 23 to the outside of chamber 17 for manipulating this valve.

The plate 1 is connected to the head stock of a lathe in any convenient way so that it is revolved around a fixed axis.

The operation is as follows:

The glass tube upon which work is to be done is placed with its bottom pressing against the gasket 10 to close the space within this gasket, and the valve 23 is opened by pushing rod 26, whereupon the vacuum appearing inside the gasket 10 and between the face 8 and bottom of the tube holds the tube in place.

After the tube has been processed or when it is desired to remove it for any reason, the valve 19 is opened momentarily by pressing the head 20, whereupon the vacuum in the chamber 17 and at the face of the disc 8 is broken, thus releasing the tube without appreciable effect on the main vacuum source because the rush of air through the pipe 22 sucks the valve 23 against the end of pipe 22 thus preventing further loss of vacuum. Also, accidental removal of the tube that is being processed or too much leakage of air into the space inside of the gasket 10 or breakage of a portion of the tube inside this gasket will permit an inrush of air to close the valve 23.

In the modification shown in Fig. 2 the corresponding parts are shown by the same reference characters with primes. In this modification flexible discs 28 are hermetically attached to the ends of the ring 15'. Each one of these rings is provided with a hub 29 in which the shaft 3' is revoluble. A compression spring 30 between the discs 28 press the same outwardly so that the rounded ends of the hubs 29 bear against the ends of the shoulders 4' and 6' and prevent leakage. The ends of the hubs 29 are preferably rounded off to make better provision against leakage.

What is claimed is:

1. In a device of the character described, a revoluble chuck and a vacuum chamber, a tube, bellows and shaft providing communication between said chuck and chamber, and vacuum operated means to cut off said communication.

2. In a device of the character described, a revoluble chuck and a vacuum chamber, a tube, bellows and shaft providing communication between said chuck and chamber, vacuum operated means to cut off said communication, and manually operable means to re-establish said communication.

CHARLES B. PETRY.